United States Patent [19]  [11] 4,436,523
Hugelshofer et al.  [45] Mar. 13, 1984

[54] PROCESS FOR THE PREPARATION OF STORAGE STABLE COLORANT COMPOSITIONS BY ULTRAFILTRATION AND WET MILLING

[75] Inventors: Paul Hugelshofer, Muttenz; Peter Zbinden, Hölstein; Zdenek Koci, Binningen, all of Switzerland

[73] Assignee: Ciba-Geigy Corporation, Ardsley, N.Y.

[21] Appl. No.: 419,660

[22] Filed: Sep. 20, 1982

[30] Foreign Application Priority Data

Sep. 29, 1981 [CH] Switzerland ................... 6258/81

[51] Int. Cl.³ .................... C09B 67/46; D06P 1/16
[52] U.S. Cl. ............................. 8/527; 8/524; 8/650; 8/918; 8/922
[58] Field of Search ....................... 8/527, 650

[56] References Cited

U.S. PATENT DOCUMENTS 4,247,401  1/1981  Bloch et al. .................... 210/638
4,329,145  5/1982  Koll et al. ........................ 8/527

FOREIGN PATENT DOCUMENTS 26399  4/1981  European Pat. Off.
1359898  7/1974  United Kingdom .
1438118  6/1976  United Kingdom .
2014597  8/1979  United Kingdom .

Primary Examiner—A. Lionel Clingman
Attorney, Agent, or Firm—Edward McC. Roberts

[57] ABSTRACT

The invention relates to a process for the preparation of storage stable compositions of sparingly soluble or water-insoluble colorants, which process comprises mixing an aqueous suspension of at least one sparingly soluble or water-insoluble colorant with at least one surface-active substance, subjecting the mixture to ultrafiltration through an asymmetrical membrane which contains ionic groups and has a pore diameter of 1 to 500 Å and a cut-off level in the molecular weight range from 300 to 500, subsequently subjecting the resultant concentrate to wet grinding and, if desired, drying, in particular spray drying the dispersion so obtained. The colorant compositions are particularly suitable for preparing padding liquors, dyebaths and printing pastes for coloring and printing textile materials, especially those made from cellulose and synthetic polyester.

20 Claims, No Drawings

PROCESS FOR THE PREPARATION OF STORAGE STABLE COLORANT COMPOSITIONS BY ULTRAFILTRATION AND WET MILLING

The present invention relates to a process for the preparation of concentrated storage stable liquid or powdered colorant compositions which contain dyes or pigments which are sparingly soluble or insoluble in water, i.e. which do not contain water-solubilising groups, by means of ultrafiltration.

Up to now, such compositions have been prepared on an industrial scale by treating the aqueous filter cakes with conventional dispersants and extenders and then subjecting them to wet grinding.

This in principle reliable method, however, always runs into considerable difficulties whenever the colorant precipitates in very small particles which cannot be readily filtered. Within economically tolerable filtration times, filter cakes containing only 5 to 50% of colorant are then obtained.

In such cases (especially when the filter cakes have a solids content of less than 35%) it has up to now been necessary to concentrate the colorant dispersion—to which dispersants may have been added—either by heating, or to evaporate it completely to dryness and subsequently to redisperse it. Aside from the fact that such methods require a high consumption of energy and many dyes do not withstand such a heat treatment without detriment to their properties, and that for reasons of safety an inert drying must be carried out, a number of other serious short-comings arise. For example, when concentrating the dispersions an aggregation and, in some cases, the formation of coarse crystals, is regularly observed, and only complicated grinding operations can rectify the deficiency.

Processes for demineralising and concentrating aqueous dispersions of sparingly soluble or insoluble dyes by membrane separating methods are already known. For example, according to European published patent application No. 00 24 667 (corresponding to German Offenlegungsschrift No. 29 34 949), dyestuff filter cakes are subjected to wet grinding in the presence of dispersants and then concentrated to a higher content of dye by membrane separation methods. However, the disadvantage of this process is that the separation does not produce optimum results.

It has now been found that concentrated storage stable colorant compositions are obtained from filter cakes without the shortcomings referred to above, by mixing said filter cakes first with a surface-active compound, subjecting the mixture to ultrafiltration using specific membranes with a low cut-off level, and subsequently wet grinding the resultant concentrate.

If desired, a start may also be made from the reaction solution or from an aqueous suspension of the colorant dye powder. Accordingly, the process of this invention comprises mixing an aqueous suspension of at least one colorant which is sparingly soluble or insoluble in water with at least one surface-active compound, subjecting the mixture to ultrafiltration through an asymmetrical membrane which contains ionic groups, has a pore diameter of 1 to 500 Å and a molecular weight cut-off level in the range from 300 to 500, then subjecting the concentrate so obtained to wet grinding and, if desired, drying, in particular spray-drying, the dispersion so obtained.

Suitable water-insoluble or sparingly water-soluble colorants are pigments and, in particular, disperse dyes and vat dyes. The dyes belong to various classes, the disperse dyes being, for example, nitro dyes, aminoketone dyes, ketone-imine dyes, methine dyes, nitrodiphenylamine dyes, quinoline dyes, aminonaphthoquinone dyes, coumarin dyes and especially anthraquinone dyes and azo dyes such as monoazo and disazo dyes.

Vat dyes are, for example, indigoid dyes, anthraquinonoid dyes, for example indanthrene, and also sulfur dyes.

Dyes will also be understood as comprising fluorescent whitening agents. The latter are, for example, fluorescent whitening agents which are water-insoluble or sparingly soluble and belong to the following classes of compounds: stilbenes, coumarins, benzocoumarins, pyrenes, pyrazines, pyrazolines, oxazines, mono- or dibenzoxazolyl or -benzimidazolyl compounds, aryltriazole and v-triazole derivatives and naphthalimides.

The dyes eligible for use in the practice of this invention are known and may be prepared by known methods The liquid colorant compositions obtained by the process of this invention advantageously contain 10 to 50% by weight, preferably 20 to 40% by weight, of colorant. The solid compositions advantageously contain 20 to 70% by weight of colorant.

The concentrated liquid compositions prepared by the process of this invention contain water-soluble surface-active compounds as additives as well as textile auxiliaries or foam inhibiting assistants conventionally employed in dyeing, e.g. silicone oils, humectants, e.g. sugar-like substances such as sorbitol, and antifreeze agents such as ethylene glycol, as well as fungicides and/or bactericides.

When using vat dyes it is sometimes advantageous, especially in the pad-steam method with relatively short vatting times (e.g. 30 to 45 seconds), to add small amounts (0.2 to 3% by weight, based on the composition) of vatting catalysts, e.g. 2-hydroxyanthraquinone, 2,6-dihydroxyanthraquinone or the compound of the formula

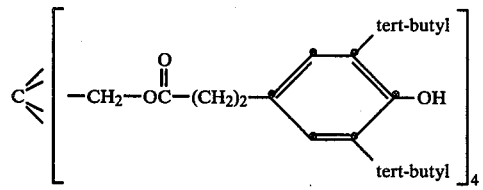

Besides water-soluble surfactants, examples of suitable additives for the solid compositions are binders such as dextrin, saccharose, starch, alginates, gelatin, glycerol, glycols, carboxymethyl cellulose, polyvinyl pyrrolidones, polyvinyl alcohols, or dust inhibitors such as a mixture of mineral oil and an emulsifier, a mixture of paraffin oil and a non-ionic emulsifier, or silicone oils.

The suitable surface-active compounds (surfactants) may be employed singly or in admixture. They are preferably used in the liquid compositions in amounts of 1 to 30% by weight, and in the solid compositions in amounts of 30 to 80% by weight, based on the colorant composition.

Examples of surfactants which are eligible for use in the practice of the invention are; anionic, cationic or non-ionic wetting agents or dispersants such as sodium dioctylsulfosuccinate, dibutyl naphthalenesulfonate, dodecylbenzene sulfonate, laurylpyridinium chloride, alkylphenyl polyglycol ether, stearyl diphenyloxyethyl diethylenetriamine and ethylene oxide adducts.

Preferred anionic surfactants are condensation products of aromatic sulfonic acids with formaldehyde such as condensation products of formaldehyde, naphthalenesulfonic acid and benzenesulfonic acid, or a condensation product of crude cresol, formaldehyde and naphthalenesulfonic acid, as well as, in particular, condensation products of phenolsulfonic acid, cresolsulfonic acid or naphtholsulfonic acid and formaldehyde, or lignosulfonates (sulfite cellulose lye) or oxylignosulfonates and, most preferably, condensation products of naphthalenesulfonic acid and formaldehyde and their alkali salts and/or ammonium salts.

Suitable non-ionic surface-active compounds are in particular: polyethylene glycols having a molecular weight of preferably 200 to 1000; copolymers of ethylene oxide and propylene oxide (block polymers), reaction products of fatty acids containing 8 to 22 carbon atoms and amines or hydroxyalkylamines, e.g. coconut fatty acid amide, oleic acid diethanolamide or coconut fatty acid ethanolamide; as well as adducts of e.g. 5 to 80 moles, preferably 10 to 30 moles of an alkylene oxide, preferably ethylene oxide, with a higher fatty acid, preferably one containing 8 to 22 carbon atoms, the individual ethylene oxide units of which adducts may be replaced by substituted epoxides such as styrene oxide and/or propylene oxide, e.g. adducts of fatty acids (e.g. oleic acid or ricinolic acid) with 10 to 30 moles of ethylene oxide, preferably an adduct of oleic acid and 20 moles of ethylene oxide, or a ricinolic acid ester with 15 moles of ethylene oxide, or adducts of alkylene oxides with saturated or unsaturated alcohols, mercaptans or amines containing 8 to 22 carbon atoms, or with alkylphenols or alkylthiophenols, the alkyl moiety of which contains at least 7 carbon atoms, e.g. fatty alcohol polyglycol ethers, preferably those derived from an aliphatic hydrocarbon radical containing 8 to 22 carbons and etherified with 5 to 200 moles, preferably 20 to 100 moles, of ethylene oxide, such as cetyl alcohol etherified with 25 moles of ethylene oxide, stearyl alcohol etherified with 25 to 80 moles of ethylene oxide, and oleyl alcohol etherified with 20 to 80 moles of ethylene oxide; as well as hydroabietyl alcohol etherified with 25 to 100 moles of ethylene oxide, or p-nonylphenol etherified with 9 moles of ethylene oxide.

Particularly suitable for the preparation of colorant compositions containing specific disperse dyes for use in printing pastes with synthetic thickeners are dispersant mixtures comprising a non-ionic copolymer of ethylene oxide with a further olefin oxide containing at least 65% of ethylene oxide and having a molecular weight higher than 12,000, together with a water-soluble aminoplast precondensate.

Suitable water-soluble aminoplast precondensates are condensation products which may be obtained by reaction of a carbonyl compound with a compound containing amino, imino or amide groups.

As carbonyl compounds there are preferably used aldehydes or ketones, e.g. acetaldehyde, propionaldehyde, n-butyraldehyde, iso-butyraldehyde or crotonaldehyde, as well as glyoxal, chloral, acrolein, furfural, acetone, diethyl ketone, ethyl propyl ketone, cyclohexanone, and, in particular, formaldehyde.

Suitable compounds containing amino, imino or amide groups are e.g. acid amides, such as acetamide, propionamide, butyramide, urethanes, such as methyl-, ethyl- or propylurethane, sulfonamides such as methane-, ethane-, propane-or butanesulfonamide, guanidine, sulfurylamide, cyanamide, dicyandiamide, thiourea or unsubstituted or substituted aniline, as well as preferably benzo- or acetoguanamine, melamine, and urea and urea derivatives, such as acetylene diurea, ethylene urea, propylene urea, oxyethyl ethylene urea, or alkyl triazones, for example methyl or ethyl triazone. Of these compounds, the most preferred are urea and melamine.

The OH groups of the above aminoplast precondensates may be completely or partially etherified. The etherification may be carried out by reaction of the condensation products obtained from aldehyde or ketone and carbonyl compound with a lower alcohol, preferably methanol.

Particularly valuable aminoplast precondensates are the condensation products of formaldehyde with a urea derivative, benzo- or acetoguanamine, and, most particularly, urea and melamine, in which latter case at least 2 moles of formaldehyde per mole of urea or melamine are reacted.

Examples of such particularly suitable aminoplast precondensates are: dimethylol melamine, hexamethylol melamine, pentamethylol melamine etherified with 2 to 3 moles or with 5 moles of methanol, dimethylol urea and tetramethylol urea.

It is also possible to employ mixtures of the above aminoplast precondensates.

The process of the present invention may be carried out in the following manner. An aqueous suspension of the untreated dye is first mixed with sufficient dispersant using a high-speed impeller or homogeniser (Polytren, Ultraturrax, Dispax, Y- ray mixer etc.) so as to obtain a readily flowable formulation. If necessary, the slurry so obtained may be subjected to a brief preliminary grinding procedure, e.g. in a ball mill, sand mill or dowelled disc mill, in order to comminute any coarse dye particles present. The main grinding operation, however, is carried out after ultrafiltration.

The pH of the suspension so obtained is conveniently kept in the range from 6 to 8.5, preferably from 7 to 7.5, e.g. with hydrochloric acid or sodium hydroxide solution. This suspension is then purified and concentrated by passing it through a semipermeable membrane having a pore diameter of 1 to 500 Å.

As starting suspension it is possible to use the aqueous suspension obtained direct from the synthesis or, preferably, the moist aqueous filter cake of the crude colorants, which may be suspended with additional water, if desired, and which contains a varying amount of unwanted dissolved substances of low molecular weight, especially of by-products and dissolved inorganic and organic salts formed during the synthesis of the colorant. If, for example, the coupling or condensation product cannot be isolated, or can be isolated only with the greatest difficulty, then the crude coupling, condensation or neutralisation solution may also be used direct. It is advantageous to use starting suspensions which contain 10 to 20% of colorant. However, it is also possible to start from the dry crude colorant powder if it is first suspended in water.

If desired, the synthesis mixture may be diluted with water and/or further ingredients required for the preparation of the liquid compositions may be added thereto. In this manner the additives, in particular the surface-active compounds, are likewise demineralised and concentrated in a single operation. It will, of course, be readily understood that only those ingredients are added which are also retained by the membrane and which, moreover, do not modify the membrane. To remove synthesis by-products with molecular weights below the cut-off level of the membrane employed, the mixture is passed through the semipermeable membrane. At the same time the mixture is concentrated to a dye content of 20 to 60% by weight, preferably of 30 to to 40% by weight, with virtually no loss of active substance whose molecular weight is above the cut-off level.

The concentrate so obtained is then subjected to wet grinding, for which operation the conventional colloid mills, vibratory and ball mills, dowelled disc mills, vibromills, dissolvers and submicron dispersers may be used as high-performance dispersing devices. However, it is preferred to use microsol mills or continuous agitator mills with grinding elements, preferably those of $SiO_2$ with a diameter of 0.2 to 5 mm, so-called glass bead mills or sand mills.

Further amounts of dispersants and further ingredients may be added before, during or after the wet grinding operation. The exact colour strength is adjusted in this manner with e.g. water, hydrotropic substances such as ethylene glycols, glycerol etc, preservatives, wetting agents, antifoams and the like.

By means of the ultrafiltration, salts and other low molecular compounds are removed from the slurry while simultaneously concentrating the dispersion. Owing to the specific membranes employed in the process of this invention and to the addition of surface-active compounds to the starting dispersion, the ultrafiltration is carried out easily without the membrane pores becoming clogged. As a consequence of the preliminary purification and concentration of the dispersion by ultrafiltration it is possible to shorten substantially the duration of the subsequent grinding of the slurry. In addition, the otherwise customary drying of the crude dye filter cake in order to concentrate it may be dispensed with, as this step is rendered entirely superfluous.

The membranes employed in the process of this invention consist substantially of a polymer material which is modified at least at the surface by radicals which contain ionisable groups. It is possible in this manner to modify natural, regenerated or synthetic materials to give membranes. A polymer material to be modified in this manner may contain, as reactive group, e.g. hydroxyl, amino and/or amidoxime groups. It can then be reacted with suitable reagents which, on the one hand, contain ionisable groups and, on the other, at least one reactive group to form a chemical (covalent) bond.

The following polymeric compounds, for example, may be modified in the indicated manner:
cellulose acetates, e.g. those having a low content of acetyl groups, but also higher acylated cellulose, e.g. 2 ½-acetate, or
polyvinyl alcohols, or
polyacrylonitrile and copolymers of acrylonitrile and other monomers having ethylenic unsaturation.

Suitable reactive reagents which contain an ionisable group are colourless and coloured compounds, e.g. ionic reactive dyes which may belong to different classes, such as anthraquinone, azo or formazane dyes. They may also be in the form of metal complexes. Typical examples of reactive groups are: carboxylic acid halide groups, sulfonic acid halide groups, radicals of α,β-unsaturated carboxylic acids or amides, e.g. radicals of acrylic, methacrylic, α-chloroacrylic or α-bromoacrylic acid, acrylamide radicals, radicals of preferably lower haloalkylcarboxylic acids, e.g. of chloroacetic acid, α,β-dichloropropionic acid or α,β-dibromopropionic acid; radicals of fluorocyclobutanecarboxylic acids, e.g. of tri- or tetrafluorocyclobutanecarboxylic acid; radicals containing vinylacyl groups, e.g. vinylsulfonyl groups or carboxyvinyl groups; radicals which contain ethylsulfonyl groups ($-SO_2CH_2CH_2OSO_2OH$, $-SO_2CH_2CH_2Cl$) or ethylaminosulfonyl groups, e.g. radicals or dihaloquinoxalines, dihalopyridazones, dihalophthalazines, halobenzthiazoles, or preferably halogenated pyrimidines or 1,3,5-triazines, e.g. radicals of monohalotriazines, dihalotriazines, 2,4-dihalopyrimidines or 2,5,6-trihalopyrimidines. Suitable halogen atoms in the above radicals are fluorine, bromine and, in particular, chlorine atoms.

Examples of suitable ionisable groups are sulfato groups, sulfonic acid groups, sulfonamide groups, carboxylic acid groups, carboxamide groups, hydroxyl, thiol, isocyanate and/or isothiocyanate groups, primary, secondary or tertiary amino groups, and also phosphonium or sulfonium groups. Reactive compounds (reactive dyes) containing sulfonic acid groups, carboxylic acid groups or ammonium groups, are preferred.

Those polymer membranes are particularly useful and versatile which are modified by an azo dye which contains sulfonic acid groups. The azo dye may also contain a complexed metal. e.g. copper.

Membranes obtained from (partially acetylated) cellulose acetate may be modified e.g. by reaction with the reactive ionic compounds previously referred to, especially anionic reactive dyes. Such membranes are described e.g. in German Offenlegungsschrift No. 2 505 254.

A further modification of cellulose acetate may be effected e.g. by the following chemical reactions (in the indicated sequence):polyfunctional monomer containing at least two functional groups (e.g. cyanuric chloride), polyfunctional oligomer or polymer (e.g. polyethyleneimine), ionic compound (e.g. ionic reactive dye which contains reactive groups and ionic groups of the kind indicated above). Such modified cellulose acetate membranes are described, in European patent application No. 26 399.

Membranes which contain polyvinyl alcohol may also be modified in corresponding manner.

The polyfunctional monomer preferably contains at least two functional groups. Examples of suitable compounds are cyclic carbonimide halides, isocyanates, isothiocyanates or N-methylol compounds, with halodiazines or halotriazines, e.g. cyanuric halides, preferably cyanuric chloride, or tri- or tetrahalopyrimidines, preferably tetrachloropyrimidine, being particularly suitable.

The polyfunctional oligomers or polymers contain in particular aliphatic or aromatic amino, hydroxyl, thiol, isocyanate and/or isothiocyanate groups. Suitable polyfunctional polymers are e.g. polyethyleneimine, polyvinyl alcohol, cellulose derivatives, polyvinylamine or polyvinyl aniline, with polyethyleneimine being preferred. The membrane contains, as ionic groups, preferably sulfonic acid, carboxylic acid or ammonium groups. Membranes which contain the radicals of an anionic reactive dye are particularly advantageous.

In addition, it is also possible to use those membranes which consist of a basic skeleton which contains polyacrylonitrile or a polymer of acrylonitrile and other monomers having ethylenic unsaturation, and which are described e.g. in European patent application No. 25 973.

Amidoxime groups are introduced into the membranes by reaction with hydroxylamine, and the membrane is then modified in the same way as cellulose acetate membranes as described in European patent application No. 26 399.

The content of acrylonitrile units in the basic skeleton of the membrane is advantageously at least 5% by weight and preferably at least 20% by weight. Preferred are copolymers of acrylonitrile and vinyl acetate, vinyl ethers, vinyl pyridine, vinyl chloride, styrene, butadiene, acrylic acid, methacrylic acid, maleic anhydride, 2-aminomethylmethacrylate or allyl compounds or also terpolymers or tetrapolymers of acrylonitrile.

The so modified membranes may also in addition be subjected to a heat treatment ("tempering"), by means of which the pore size of the membrane skin is substantially determined. The membrane is treated e.g. for 1 to 30 minutes at a temperature in the range from 60° to 90° C., conveniently by immersing it in warm water. If appropriate, the heat treatment may also be carried out before the reaction with the reactive compound which contains ionisable groups. Further, the reaction may also be carried out before the polymeric material is processed to the asymmetrical membrane.

The membranes may be in different forms, e.g. disc-shaped, lamellar, tube-shaped, in the form of a bag, cone or of hollow fibres. In order to use them effectively for the separation of substances, they have to be integrated into appropriate systems (modules) and incorporated into units e.g. for pressure permeation.

The above described membranes employed in the process of this invention for separating and/or purifying dilute dispersant solutions by the principle of reverse osmosis are those which have a molecular weight cut-off level in the raage from 300 to 500, preferably from 400 to 500, and which are symmetrical or, preferably, asymmetrical. They allow water and dissolved substances whose molecular weight is below the cut-off level to pass through at high rates per unit of area and at low to medium pressure. Pressures of 10 to 100 bar, preferably of 10 to 30 bar, are applied in the process of the invention. The pressure may be applied e.g. by means of a pump. When carrying out the process, pH values and temperatures may vary within wide ranges. As a rule they are not crucial for the membranes employed.

In a single passage through the membrane, the degree of purification and/or demineralisation, without loss of dye or dispersant, can be up to 70% and more. Moreover, the volume of the solution of the retained substances (in the concentrate) decreases correspondingly and the concentration of the retained portion increases. If a further reduction of the low molecular constituents is desired, this may be accomplished without difficulty after conveniently diluting the retained solution or suspension with water to the initial volume by repeating the process once or more than once. The separation may also be carried out continuously by adapting the rate of addition of water to that of the permeate membrane. Demineralisation and purification effects of up to 95% or, if desired, even up to 99% and more, i.e. until the permeate is free from undesirable matter, may be obtained discontinuously and continuously in this simple manner at room temperature.

The very pure concentrated fluid dispersant formulations obtained according to this invention are true solutions. They are of low viscosity and very storage stable, i.e. they remain in a ready for use condition for at least several months in the temperature range from −20° to +60° C., preferably from −10° to +40° C.

Compared with the conventional processes employed up to now for preparing liquid colorant compositions, the process of the present invention affords, among others, the following advantages; The process of this invention for the preparation of liquid colorant compositions makes it possible not only to prepare products having improved properties, e.g. liquid compositions of low viscosity and thixotropy, without having to dry the crude dye beforehand, and having in some cases increased colour strength, improved storage stability and increased application stability, but also affords technical advantages compared with conventional processes because a number of process steps, e.g. troublesome filtration operations or centrifuging, drying and redispersing, may be eliminated or speeded up, resulting in a saving in time and energy. Owing to the higher concentration of colorant in the slurry it is possible to shorten substantially the time required for the grinding operation, resulting in a better utilisation of the grinding capacity.

If desired, the liquid (aqueous) dye or pigment compositions may be converted into powder form. Less energy for drying is required on account of the increased colorant concentration. Conventional drying methods, especially spray drying, are employed.

The powder formulations obtained by the process of this invention can in some cases have an increased bulk density, are readily wettable and redispersible, and can be easily reconverted into a form suitable for application. They are also most suitable for the preparation of liquid compositions which have a low content of electrolytes, e.g. the migration controllable dye compositions described in German Offenlegungsschrift 28 16 549 and the disperse dye formulations of British patent specification 1 513 160, German Offenlegungsschrift 28 50 482 and European published patent specification 0 007 604, in which compositions the dispersant or dispersant mixture is already added in appropriate amounts to the crude dye before the ultrafiltration. Such dye formulations have the following composition and have a Brookfield viscosity of 100–800 cP:

30–42% by weight of dye,
1–2% by weight of the sodium salt of condensed naphthalenesulfonic acid,
1–3% by weight of a non-ionic dispersant,
20% by weight of a hydrotropic agent, e.g. urea, remainder comprising water, glycols, biocides and thickeners, or 25–60% by weight, preferably 35–50% by weight, of dye,
0.1–5% by weight of an anionic dispersant, preferably sodium lignosulfonate, or a water-soluble aminoplast precondensate, e.g. a condensation product of formaldehyde with a urea derivative, benzoguanamine or acetoguanamine, and, in particular, urea or melamine,
0.5–5% by weight of a non-ionic copolymer of ethylene oxide and a further olefin oxide which contains at least 65% by weight of ethylene oxide and has a molecular weight greater than 12,000, optionally further non-ionic ingredients, remainder comprising water, glycols, biocides and, if desired, thickeners.

The concentrated and stable liquid colorant compositions obtained by the process of this invention has a wide range of utilities. Both water and organic solvents and/or thickeners may be added to the colorant or fluorescent whitener compositions without causing precipitation of the colorant or other forms of inhomogeneity. The padding liquors, dyebaths and printing pastes may be used e.g. for dyeing or printing textile materials made of natural or synthetic fibres, such as cellulosic fibre materials and synthetic polyester, in known manner.

It will be appreciated that the type of colorant employed will be substantially determined by the desired shade and by the field of use of the aqueous and powdered colorant compositions. If these are used e.g. for preparing printing pastes and for further use in transfer printing, then as water-insoluble or sparingly soluble dyes there will be used those dyes which are suitable for transfer printing, in particular disperse dyes which are converted into the vapour state at atmospheric pressure in the temperature range from 150° to 220° C. in less than 60 seconds to a degree of at least 60%, and which are heat stable and transferable without decomposition.

If the compositions are used e.g. for preparing printing pastes for the direct printing of textile materials, a preferred utility of the colorant compositions, or for preparing dyebaths for dyeing textile materials, then disperse dye are used which have good dyeing and fixation properties and give dyeings which are fast to wet treatments, sublimation and light.

Further, it is also possible to use mixtures of identical or different types of dye as well as fluorescent whitening agents as defined herein in the compositions of the invention.

Pigment dispersions are suitable e.g. for the preparation of disperse paints as well as for the preparation of printing inks for paper and for textile printing. Paste formulations have moreover a lower viscosity, so that their colorant concentration may conveniently be increased.

The invention is illustrated by the following Examples, in which parts and percentages are by weight, unless otherwise indicated. Concerning the viscosities, 1 cP=0.001 Pa.s.

The preparation of the membranes used in the process of the invention is described in German Offenlegungsschrift specifications No. 25 05 254 and 30 35 134 and in European patent application No. 26399.

EXAMPLE 1

4960 parts of moist filter cake of the dye of the formula

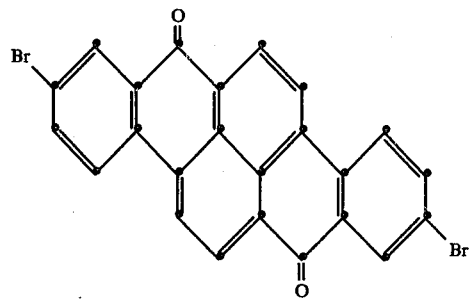

containing 1331 parts of crude dye (26.8% solids content) are mixed with 1052 parts of lignosulfonate solution (46.5% solids content=489 parts of solid) and dispersed in a homogeniser. 6013 parts of the resultant suspension (30.3% solids content), which has a pH of 7.2, is concentrated in an ultrafiltration unit (membrane area 0.84 m²) which is equipped with the modified polyacrylonitrile membranes (cut-off level at a molecular weight of about 500) described in German Offenlegungsschrift No. 30 35 134, Example 1. The ultrafiltration is carried out in the pH range from 6 to 7.5 and under a pressure of 25 bar.

In this manner the dispersion is readily concentrated, e.g. without the pores of the membrane becoming clogged, to a solids content of 49.5% (i.e. about 37.2% of dye and about 12.3% of lignosulfonate). A slurry of very low viscosity is obtained (63 cP at 20° C., determined with a Brookfield viscosimeter, spindle 1 at 30 rpm). The concentrated slurry is then ground in a glass bead mill to a finely dispersed liquid commercial formulation. A sand mill may likewise be used. When the grinding operation is complete, the bulk of the particles have a diameter of about 2 μm, some are larger and have a diameter of about 4 μm and a few have a diameter of about 6 μm. With stirring, 2.58 parts of lignosulfonate, 22.3 parts of sorbitol and 0.45 part of a microbicide are added at room temperature to 100 parts of the above dye dispersion, followed by dilution with about 24 parts of water. A low viscosity, storage stable liquid formulation of the following composition is obtained: 25% of dye, 10% of lignosulfonate, 15% of sorbitol, 0.3% of microbicide and about 49.7% of water.

By means of ultrafiltration the dye slurry is concentrated in simple manner without having to dry the filter cake of the crude dye or to evaporate the dispersion to dryness e.g. by applying a vacuum. In addition, the grinding time is substantially shortened.

EXAMPLE 2 21 parts of moist filter cake of the dye of the formula

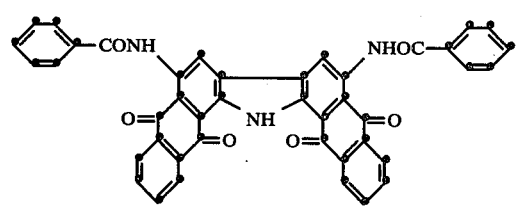

containing 5.25 parts of crude dye (about 25% solids content) are stirred in 15.1 parts of water and 0.9 part of a dispersant (oxylignosulfonate). This dispersion has a solids content of about 16.6%. The dispersion is concentrated to a solids content of 40.9% by ultrafiltration as described in Example 1, giving 14.8 parts of concentrate. The concentrated slurry is then ground as described in Example 1.

2.05 parts of oxylignosulfonate, 4.95 parts of sorbitol, 1.24 parts of ethylene glycol and 0.12 part of a microbicide are stirred into 14.8 parts of the above dye dispersion, followed by dilution with about 1.6 parts of water. A stable liquid formulation of the following composition is obtained: 20.8% of dye, 11.9% of an oxylignosulfonate dispersant, 20% of sorbitol, 5% of ethylene glycol, 0.5% of a microbicide and about 41.8% of water.

EXAMPLE 3

10,008 parts of moist filter cake of the dye indicated in Example 1 containing 2966 parts of crude dye (about 29.8% solids content) are stirred in 1039 parts of a 44.2% aqueous solution of a dispersant of the dinaphthylmethane disulfonate type (corresponding to 459 parts of 100% dispersant, containing about 25% of salts) and the mixture is homogenised for 1 hour. The dispersion is then ground for 1 hour in a ball or sand mill and the resultant suspension (solids content about 31%) is adjusted with hydrochloric acid to pH 7 to 7.5. The solids content of this suspension is then increased to 43.2% by ultrafiltration as described in Example 1.

A liquid commercial formulation is prepared by further grinding and addition of 253 parts of dinaphthylmethane disulfonate in the form of a 44.2% aqueous solution, 2373 parts of ethylene glycol (as humectant-/antifreeze agent) and 57 parts of a microbicide, followed by dilution with 1063 parts of water for adjustment to the desired tinctoral strength. A liquid formulation of the following composition is obtained: 26% of dye, 4% of a dispersant of the dinaphthylmethane disulfonate type, 20.8% of ethylene glycol, 0.5% of a microbicide and 48.7% of water.

EXAMPLE 4 20 parts of moist filter cake of the dye of the formula

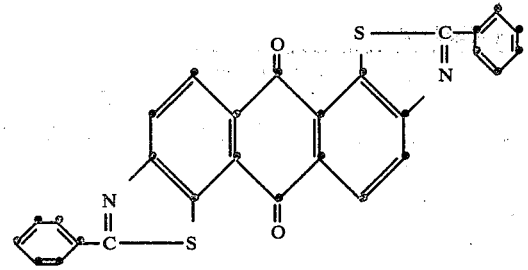

containing 5 parts of crude dye (25% solids content) are stirred in 15 parts of water and 0.87 part of a 40% aqueous solution of the sodium salt of the condensation product of naphthalenesulfonic acid and formaldehyde. The dispersion so obtained has a solids content of about 15%. This dispersion is concentrated to a solids content of about 39.3% by ultrafiltration as described in Example 1, giving 13.4 parts of concentrate. The concentrated slurry is then ground as described in Example 1.

With stirring, 2.38 parts of the sodium salt of polyacrylic acid (mol. wt. about 10,000) in powder form, 0.05 part of xanthan gum, 1.67 parts of betaine base monohydrate, 0.24 part of 30% formaldehyde solution and 4.28 parts of glycerol are added to the 13.4 parts of dye dispersion obtained above.

The mix is then diluted with about 1.78 parts of water. A storage stable liquid formulation with a low content of electrolytes and having the following composition is obtained: 21% of dye, 1.1% of naphthalenesulfonic acid/formaldehyde condensate, 10% of sodium salt of polyacrylic acid, 0.2% of xanthan gum, 7% of betaine base monohydrate, 1% of formaldehyde solution, 18% of glycerol and 41.7% of water.

This composition is most suitable for dyeing cotton by the pad-steam process to give very level dyeings.

EXAMPLE 5

500 parts of the dry, extended dye of the formula as indicated in Example 4, containing about 27% of dye, 38.6% of lignosulfonate and 29.4% of inorganic salts (Na$_2$SO$_4$ and NaCl), are suspended in 1000 parts of water. The resultant suspension (solids content about 31%) is concentrated in an ultrafiltration unit as described in Example 1, giving 860 parts of a concentrated dye dispersion (about 38% solids content). This dispersion is then diluted again with water to about 15% solids content and subjected a second time to ultrafiltration. To the resultant dispersion are added 3.5 parts of 2-hydroxyanthraquinone in the form of a fine dispersion. The slurry so obtained is ground briefly and spray dried to give a dry commercial formulation in powder form of the following composition: 38.8% of dye, 55.2% of lignosulfonate, 1% of 2-hydroxyanthraquinone and 5% of residual moisture.

EXAMPLE 6

200 parts of moist filter cake of the dye of the formula

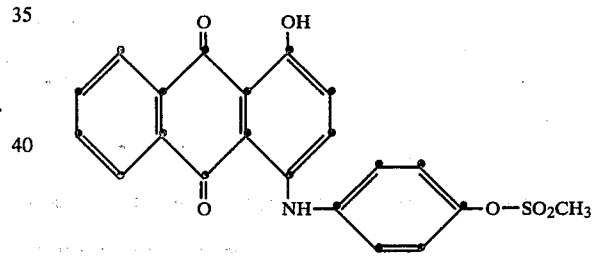

containing about 22% of crude dye, are stirred in 154 parts of water, 3 parts of a non-ionic polycondensate consisting of 20% of propylene oxide and 80% of polyethylene oxide with a molecular weight of about 16,500 and 3 parts of a 67% aqueous solution of an aminoplast precondensate prepared from 1 mole of melamine, 5 moles of formaldehyde and 2 to 3 moles of methanol. This mix (about 14% solids content) is concentrated to a solids content of about 40% as described in Example 1. The concentrated slurry is then ground as described in Example 1. The dye dispersion so obtained is then spray dried.

41.7 parts of the dry dye are then stirred into a mixture of 33.3 parts of water, 17 parts of 1,2 propylene glycol and 2 parts of formaldehyde (preservative). If desired, the viscosity of the low viscosity dispersion so obtained may be substantially increased by adding 0.1% of xanthan gum and stirring for several hours.

The advantage of this liquid commercial formulation is in particular that it has an extremely low electrolyte content and therefore causes no noticeable lowering of the viscosity in synthetic printing thickeners which are highly sensitive to electrolytes. The formulation is therefore most suitable for direct printing on polyester fabric.

EXAMPLES 7 To 12

An aqueous crude dye suspension which contains a vat dye of the formula as indicated in Tables I to III and a dispersant, is subjected to ultrafiltration as described in Example 1. The initial and final concentrations of the dye are indicated in columns 2 and 4 respectively and those of the dispersant in columns 3 and 5 respectively.

TABLE I

| Dye/Dispersant | Concentration before ultrafiltration | | Concentration after ultrafiltration | |
|---|---|---|---|---|
| | dye | dispersant | dye | dispersant |
| Example 7: 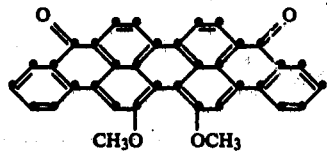 naphthalenesulfonic acid/ formaldehyde condensate | 24.2% | 0.8% 25% solids content | 43.6% 45% | 1.4% |
| Example 8: 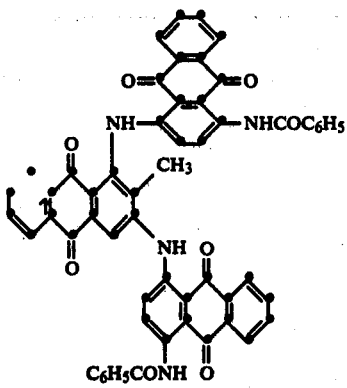 lignosulfonate | 24% | 2% 26% solids content | 31.4% 34% | 2.6% |

TABLE II

| Dye/Dispersant | Concentration before ultrafiltration | | Concentration after ultrafiltration | |
|---|---|---|---|---|
| | dye | dispersant | dye | dispersant |
| Example 9: 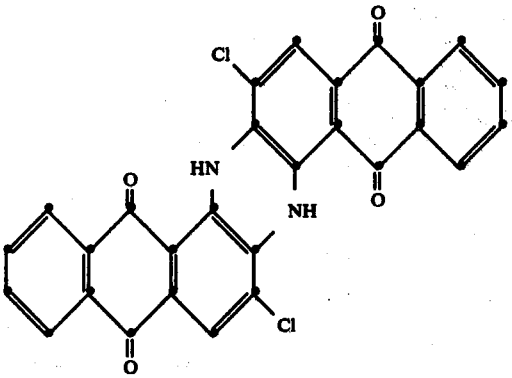 lignosulfonate Example 10: | 14% | 2.5% 16.5% solids content | 41% 48% | 7% |

TABLE II-continued

| Dye/Dispersant | Concentration before ultrafiltration | | Concentration after ultrafiltration | |
|---|---|---|---|---|
| | dye | dispersant | dye | dispersant |
| 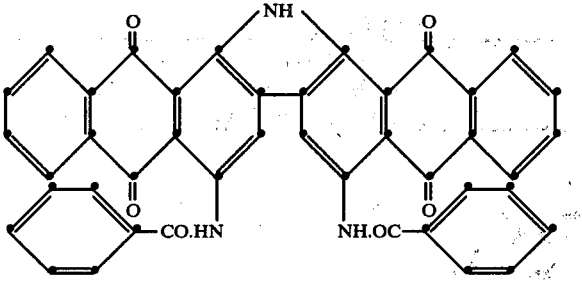
lignosulfonate | 15% 20% | 5% solids content | 24% 32% | 8% |

TABLE III

| Dye/Dispersant | Concentration before ultrafiltration | | Concentration after ultrafiltration | |
|---|---|---|---|---|
| | dye | dispersant | dye | dispersant |
| Example 11: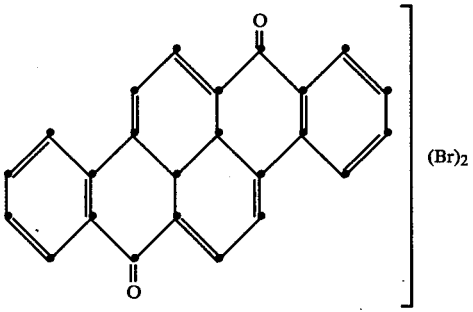
naphthalenesulfonic acid/formaldehyde condensate | 28.4% 33% | 4.6% solids content | 35.2% 41% | 5.7% |
| Example 12: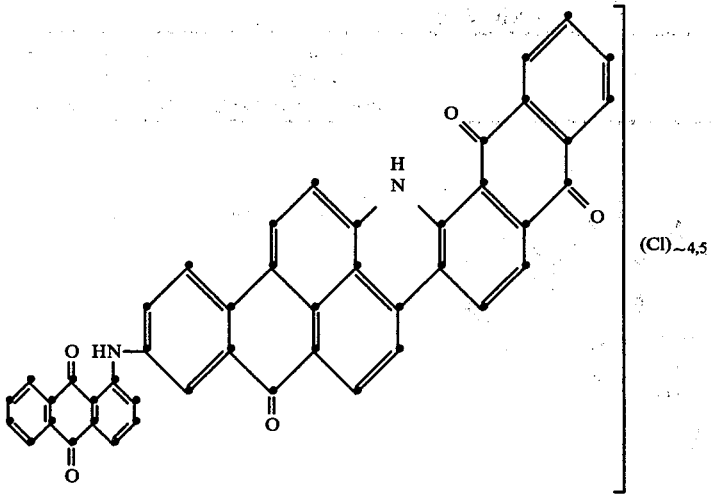
lignosulfonate | 8.7% 13% | 4.3% solids content | 22% 33% | 11% |

EXAMPLES 13 To 17

An aqueous crude dye suspension which contains a disperse dye of the formula as indicated in Tables IV and V, and a dispersant, is concentrated as described in Example 1 and demineralised. The initial and final concentrations of the dye are indicated in columns 2 and 5 respectively, those of the dispersant in columns 3 and 6 respectively, and the initial and final salt concentrations are indicated in columns 4 and 7 respectively.

TABLE IV

| Dye/Dispersant | Concentration before ultrafiltration | | | Concentration after ultrafiltration | | |
|---|---|---|---|---|---|---|
| | dye | dispersant | salt | dye | dispersant | salt |
| Example 13: | 4.6% | 1.0% | 2.4% | 32.5% | 4.5% | 1.0% |
| [structure: Cl-, NO$_2$ substituted phenyl-N=N- linked to pyridone with CH$_3$, CN, HO, N-C$_2$H$_5$, O] | | 8% | solids content | | 38% | |
| naphthalenesulfonic acid/ formaldehyde condensate | | | | | | |
| Example 14: | 4.5% | 0.7% | 8% | 31.0% | 3.5% | 0.5% |
| [structure: NO$_2$, Cl substituted phenyl-N=N- phenyl (H or CH$_3$)-N(C$_2$H$_4$CN)$_2$] | | 13.2% | solids content | | 35% | |
| (in the ratio 7:3) oxylignosulfonate C:S as 33:1 | | | | | | |
| Example 15: | 11.4% | 5.9% | 2.7% | 30.1% | 12.9% | 0.9% |
| [structure: O$_2$N-, Cl substituted phenyl-N=N- phenyl (Cl, NHCOCH$_3$)-NH-CH$_2$-CH(OH)-CH$_3$] | | 20% | solids content | | 43.9% | |
| oxylignosulfonate C:S as 33:1 | | | | | | |

TABLE V

| Dye/Dispersant | Concentration before ultrafiltration | | | Concentration after ultrafiltration | | |
|---|---|---|---|---|---|---|
| | dye | dispersant | salt | dye | dispersant | salt |
| Example 16: | 6.5% | 2.5% | 0.5% | 32.4% | 9.1% | 0.1% |
| [structure: O$_2$N-, NO$_2$, Cl substituted phenyl-N=N- with two components: (OCH$_3$, NHCOCH$_2$CH$_3$)-N(C$_2$H$_4$OC$_2$H$_4$CN)$_2$ ~40% and (OCH$_3$, NHCOCH$_2$CH$_3$)-N(H)(C$_2$H$_4$OC$_2$H$_4$CN) ~60%] | | 9.5% | solids content | | 41.6% | |
| mixtures of dyes | | | | | | |
| oxylignosulfonate C:S as 33:1 | | | | | | |
| Example 17: | 7.0% | 2.8% | 0.2% | 38.5% | 16.5% | — |
| [structure: O$_2$N-, NO$_2$, H or Cl substituted phenyl-N=N- phenyl (OCH$_3$, NHCOCH$_3$)-N(CH$_2$-phenyl)(CH$_2$CH$_2$OCOCH$_3$)] | | 10% | solids content | | 55% | |

TABLE V-continued

| Dye/Dispersant | Concentration before ultrafiltration | | | Concentration after ultrafiltration | | |
|---|---|---|---|---|---|---|
| | dye | dispersant | salt | dye | dispersant | salt |
| (in the ratio 1:3) oxylignosulfonate C:S as 23:1 | | | | | | |

EXAMPLES 18 To 20

The process of the preceding Examples is repeated using the synthesis suspension, moist filter cake or a suspension of the crude dye of one of the dyes of the formulae as indicated in Table VI. Dye concentrates with similarly high solids contents and comparably low salt concentrations are also obtained.

TABLE VI

18. $O_2N$—⟨⟩—NH—⟨⟩—$SO_2.HN$—⟨⟩

19. $O_2N$—⟨⟩—N=N—⟨⟩—N(C_2H_4OC_2H_4CN)(C_2H_4CN)

20. $O_2N$—⟨⟩(CN)(CN)—N=N—⟨⟩(NHCOCH_3)—N(CH_2CH_3)(CH_2CH_3)

What is claimed is:

1. A process for the preparation of storage stable compositions of sparingly soluble or water-insoluble colorants, which process comprises mixing an aqueous suspension of at least one sparingly soluble or water-insoluble colorant with at least one surface-active substance, subjecting the mixture to ultrafiltration through an asymmetrical membrane which contains ionic groups and has a pore diameter of 1 to 500 Å and a cut-off level in the molecular weight range from 300 to 500, and subsequently subjecting the resultant concentrate to wet grinding.

2. A process according to claim 1, wherein the reaction suspension or filter cake of the colorant is used.

3. A process according to claim 1, wherein an aqueous suspension of the dry colorant powder is used.

4. A process according to any one of claims 1 to 3, wherein the colorants are disperse dyes or vat dyes.

5. A process according to any one of claims 1 to 4, wherein additives are added to the concentrate before and/or after the wet grinding operation.

6. A process according to claim 5, wherein the additives are further surface-active compounds, textile auxiliaries, foam inhibitors, antifreeze agents, humectants, fungicides and/or bactericides.

7. A process according to any one of claims 1 to 6, wherein the surface-active compounds are anionic and/or non-ionic surface-active compounds.

8. A process according to claim 1, wherein the membrane consists of a cellulose acetate basic skeleton which is modified by reaction with an ionic compound which contains reactive groups.

9. A process according to claim 1, wherein the membrane consists of cellulose acetate basic skeleton which is modified by reaction with a polyfunctional monomer, a polyfunctional oligomer or polymer and an ionic compound which contains reactive groups.

10. A process according to claim 1, wherein the membrane consists of a basic skeleton which contains polyacrylonitrile or copolymers of acrylonitrile and other monomers having ethylenic unsaturation which are modified by reaction with hydroxylamine and subsequent reaction with a polyfunctional monomer, a polyfunctional polymer or oligomer and an ionic compound which contains reactive groups.

11. A process according to any one of claims 8 to 10, wherein the ionic compound which contains reactive groups is a reactive dye which contains sulfonic acid groups, carboxylic acid groups or ammonium groups.

12. A process according to either of claims 9 or 10, wherein the polyfunctional monomer is a cyclic carbonimide halide, an isocyanate, an isothiocyanate or a N-methylol compound.

13. A process according to either of claims 9 or 10, wherein the polyfunctional oligomer or polymer contains aliphatic or aromatic amino, hydroxyl or thiol groups.

14. A colorant composition prepared by a process as claimed in any one of claims 1 to 13.

15. A liquid colorant composition according to claim 14, which contains 10 to 50% by weight, preferably 20 to 40% by weight, of at least one sparingly soluble or insoluble colorant, based on said composition.

16. A liquid colorant composition according to either of claims 14 or 15 which contains 1 to 30% by weight of at least one surface-active compound, based on said composition.

17. A solid colorant composition according to claim 14, which contains 20 to 70% by weight of at least one sparingly soluble or insoluble colorant, based on said composition.

18. A solid colorant composition according to either of claims 14 or 17, which contains 30 to 80% by weight of at least one surface-active compound, based on said composition.

19. Natural or synthetic fibre material, colored by a colorant composition as claimed in claim 14.

20. A process for preparing padding liquors, dyebaths or printing pastes for dyeing or printing natural or synthetic fibre material, which process comprises the use of a colorant composition as claimed in claim 14.

* * * * *